L. ADAMS.
Churn.
No. 2,559.
Patented April 16, 1842.
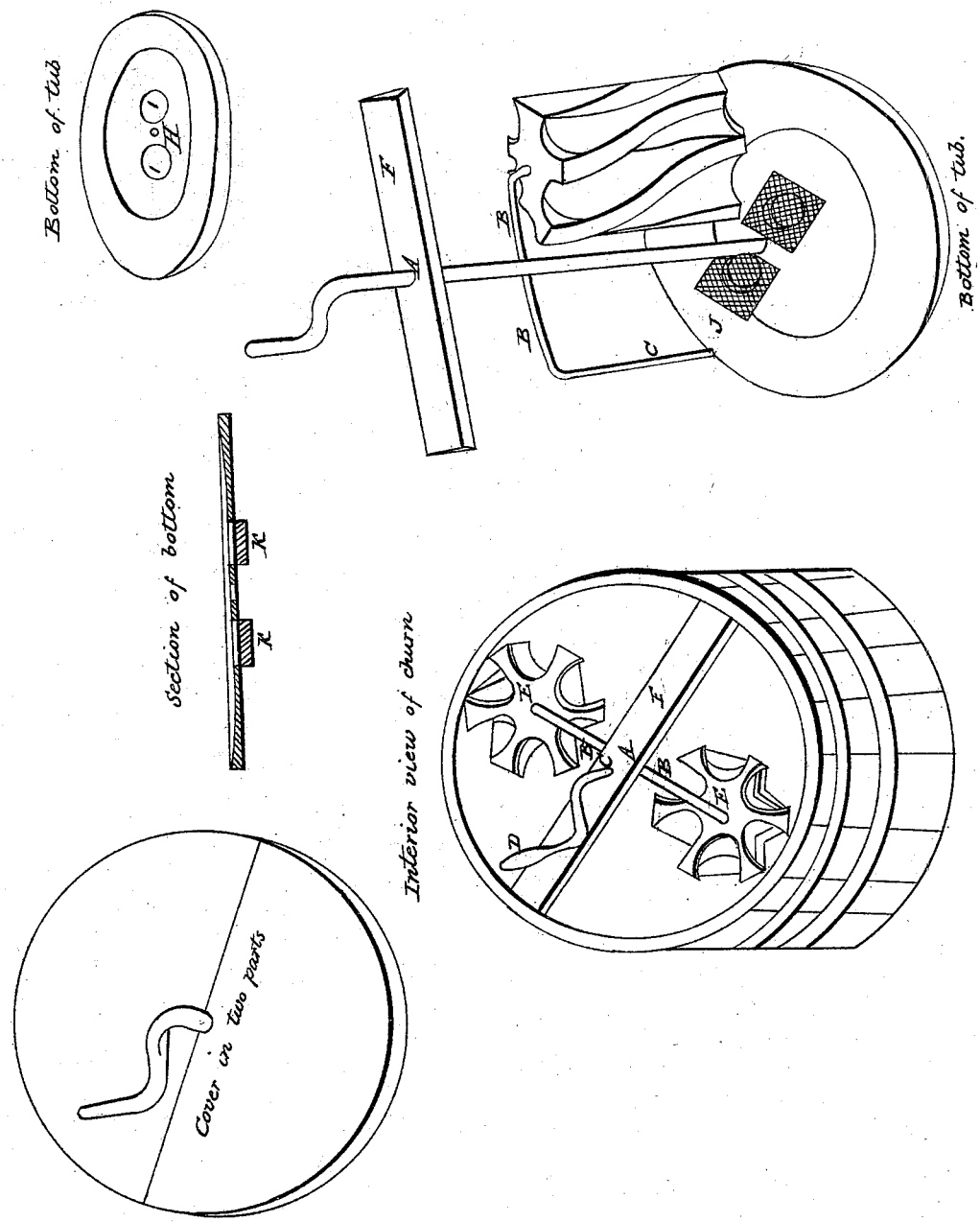

UNITED STATES PATENT OFFICE.

LEMUEL ADAMS, OF REDDING, CONNECTICUT.

CHURN.

Specification of Letters Patent No. 2,559, dated April 16, 1842.

*To all whom it may concern:*

Be it known that I, LEMUEL ADAMS, of Redding, county of Fairfield, and State of Connecticut, have invented a new and Improved Method of Churning, Working, and Salting Butter; and I do hereby declare that the following is a full and exact description.

The nature of my invention consists in providing a shaft to revolve perpendicularly in the center of a tub, with two angular arms to which are attached two horizontal rotary beaters, which when put in motion will convert cream or milk into butter, separate the buttermilk, and mix the salt.

To enable others skilled in the art, to make and use my invention, I will proceed to described its construction and operation.

I construct a perpendicular shaft as shown at A, in the accompanying drawing, with two angular arms with elbows as shown at B and C; and to each of these arms, and up close to the underside of the elbows, I connect (by sliding on to it and fastening so that it may revolve) a rotary beater. These beaters are made circular with six twisted semicircular openings, the twist being the long way of the opening and answering to the drawing at E. On the top of the shaft is a crank by which it may be turned as seen at D. The beaters above described, may be constructed with one or more wings extending outward from the center, and of suitable dimensions to occupy the space between the shaft and the side of the tub. I construct a tub of suitable dimensions for the amount of labor to be performed, with a bar across the top at F; I make a latch upon the side of the bar which may be turned so as to admit the shaft at G; I make a cover for the top of the tub which opens in two parts to receive the shaft at A; the bottom of the tub is a little concave as shown in the drawings H and section K with a socket in the center in which the foot of the perpendicular shaft revolves as shown at H; I make an opening at I, I, in the bottom of the tub on each side of the socket, and cover each opening with a strainer on the inside as shown at J, J, and close them upon the outside with corks as at K, K; the shaft may be turned by hand or by the application of power; the turning of the shaft causes the beaters to roll against the side of the tub, at the same time that they revolve on their own axis, thereby performing a double motion which converts the milk or cream into butter; when the butter is made the corks may be drawn out from the opening or valves in the bottom of the tub, and the buttermilk will flow out into a vessel placed beneath; I then continue the same operation as in churning, and the buttermilk will be entirely separated from the butter, the salt will be mixed with the butter, and the butter fitted for use.

What I claim as my invention, and desire to secure by Letters Patent, is—

The use of the horizontal rotary beaters for churning, working, and salting butter as herein described.

LEMUEL ADAMS.

Witnesses:
 ELI B. ADAMS,
 POLLY SELLICK.